United States Patent
Kahtava et al.

(10) Patent No.: US 10,200,178 B2
(45) Date of Patent: Feb. 5, 2019

(54) COMMUNICATIONS DEVICE, INFRASTRUCTURE EQUIPMENT, MOBILE COMMUNICATIONS NETWORK AND METHODS

(71) Applicant: SONY CORPORATION, Tokyo (JP)

(72) Inventors: Jussi Tapani Kahtava, Basingstoke (GB); Dimitris Koulakiotis, Basingstoke (GB); Brian Alexander Martin, Basingstoke (GB); Anders Berggren, Lund (SE); Rickard Ljung, Helsingborg (SE); Peter C. Karlsson, Lund (SE); Lars Nord, Lund (SE)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 15/313,254

(22) PCT Filed: Apr. 17, 2015

(86) PCT No.: PCT/EP2015/058429
§ 371 (c)(1),
(2) Date: Nov. 22, 2016

(87) PCT Pub. No.: WO2015/185256
PCT Pub. Date: Dec. 10, 2015

(65) Prior Publication Data
US 2017/0195099 A1    Jul. 6, 2017

(30) Foreign Application Priority Data
Jun. 5, 2014  (EP) .................................... 14171400

(51) Int. Cl.
*H04L 5/00*  (2006.01)
*H04W 16/14*  (2009.01)
(Continued)

(52) U.S. Cl.
CPC ............ *H04L 5/0053* (2013.01); *H04L 5/001* (2013.01); *H04W 16/14* (2013.01); *H04W 24/08* (2013.01);
(Continued)

(58) Field of Classification Search
CPC .. H04L 5/0053; H04L 5/001; H04W 72/0406; H04W 24/08
See application file for complete search history.

(56) References Cited

U.S. PATENT DOCUMENTS

2005/0191965 A1* 9/2005 Yu .......................... H04L 1/0026
455/67.16
2012/0039275 A1* 2/2012 Chen ..................... H04L 1/1607
370/329

(Continued)

FOREIGN PATENT DOCUMENTS

EP        2 696 530 A2    2/2014
WO    2012/152298 A1    11/2012
(Continued)

OTHER PUBLICATIONS

International Search Report dated Jul. 7, 2015 in PCT/EP2015/058429 filed Apr. 17, 2015.
(Continued)

*Primary Examiner* — Andrew Lai
*Assistant Examiner* — Harry H Kim
(74) *Attorney, Agent, or Firm* — Xsensus LLP

(57) ABSTRACT

In an infrastructure equipment forming part of a mobile communications network, a controller is configured in combination with a receiver and transmitter to receive from one or more communications devices a channel state report for each of one or more predefined candidate channels within a frequency range, each of the candidate channels representing a minimum unit of communications resource usable to
(Continued)

Outline of the measurement and scheduling relation in LTE-U system receive data on a downlink. The controller is configured to select, from the one or more candidate carriers, one or more component carriers for use in transmitting signals to the communications devices within the second frequency range to form a downlink providing a secondary cell, based on the received channel state reports, and to transmit an indication identifying the selected one or more component carriers to the one or more communications devices for use in transmitting signals to the one or more communications devices via the frequency range.

16 Claims, 10 Drawing Sheets

(51) Int. Cl.
*H04W 24/08* (2009.01)
*H04W 72/04* (2009.01)
*H04W 76/15* (2018.01)

(52) U.S. Cl.
CPC ........ *H04W 72/0406* (2013.01); *H04W 76/15* (2018.02)

(56) References Cited

U.S. PATENT DOCUMENTS

| | | | |
|---|---|---|---|
| 2012/0170547 A1* | 7/2012 | Oprescu-Surcobe | ......................... H04W 36/0083 370/331 |
| 2013/0095845 A1* | 4/2013 | Lim | ................. H04W 36/0066 455/452.2 |
| 2014/0044105 A1* | 2/2014 | Bontu | ..................... H04L 5/001 370/336 |
| 2014/0071937 A1 | 3/2014 | Klatt | |
| 2014/0112289 A1 | 4/2014 | Kim et al. | |
| 2014/0133474 A1* | 5/2014 | Damnjanovic | ........ H04W 52/30 370/336 |
| 2014/0185576 A1 | 7/2014 | Lei et al. | |
| 2014/0211672 A1 | 7/2014 | Klatt | |
| 2017/0063588 A1* | 3/2017 | Sun | ........................ H04L 5/0025 |
| 2017/0223565 A1* | 8/2017 | Ericson | ................. H04W 24/10 |

FOREIGN PATENT DOCUMENTS

| | | |
|---|---|---|
| WO | 2013/020292 A1 | 2/2013 |
| WO | 2013/082784 A1 | 6/2013 |
| WO | 2013/185835 A1 | 12/2013 |

OTHER PUBLICATIONS

Harri Holma et al., "LTE for UMTS OFDMA and SC-FDMA Based Radio Access", Wiley, 2009, 4 pages.
"LTE; Evolved Universal Terrestrial Radio Access (E-UTRA); Physical channels and modulation (3GPP TS 36.211 version 11.5.0 Release 11)", ETSI TS 136 211, Version 11.5.0, Technical Specification, Release 11, Jan. 2014, 122 pages.
"LTE; Evolved Universal Terrestrial Radio Access (E-UTRA); Multiplexing and channel coding (3GPP TS 36.212 version 11.4.0 Release 11)", ETSI TS 136 212, Version 11.4.0, Technical Specification, Release 11, Jan. 2014. 86 pages.
"LTE; Evolved Universal Terrestrial Radio Access (E-UTRA); Physical layer procedures (3GPP TS 36.213 version 11.6.0 Release 11)", ETSI TS 136 213, Version 11.6.0, Technical Specification, Release 11, Mar. 2014, 184 pages.
"LTE; Evolved Universal Terrestrial Radio Access (E-UTRA); Medium Access Control (MAC) protocol specification (3GPP TS 36.321 version 11.5.0 Release 11)", ETSI TS 136 321, Version 11.5.0, Technical Specification, Release 11, Mar. 2014, 59 pages.
"LTE; Evolved Universal Terrestrial Radio Access (E-UTRA); Radio Resource Control (RRC); Protocol specification (3GPP TS 36.331 version 11.7.0 Release 11)", ETSI TS 136 331, Version 11.7.0, Technical Specification, Release 11, Mar. 2014, 354 pages.

* cited by examiner

The configuration of a carrier aggregated Scell

Message flow chart for CQI reporting

Synchronised frame timing in co-located operation of LTE and LTE-U

Outline of the measurement and scheduling relation in LTE-U system

Process flow for CQI report averaging

COMMUNICATIONS DEVICE, INFRASTRUCTURE EQUIPMENT, MOBILE COMMUNICATIONS NETWORK AND METHODS

CROSS-REFERENCE TO RELATED APPLICATIONS

The present application is based on PCT filing PCT/EP2015/058429 filed Apr. 17, 2015, and claims priority to European Patent Application 14 171 400.6, filed in the European Patent Office on Jun. 5, 2014, the entire contents of each of which being incorporated herein by reference.

BACKGROUND

Field of Disclosure

The present disclosure relates to mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the licence grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (licence exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY OF THE DISCLOSURE

According to one example embodiment of the present technique, an infrastructure equipment forming part of a mobile communications network transmits data to or receives data from communications devices. The infrastructure equipment comprises a transmitter configured to transmit the signals to communications devices, via a wireless access interface, a receiver configured to receive the signals from the communications devices via the wireless access interface, and a controller for controlling the transmitter and the receiver to form the wireless access interface for transmitting to the communications devices and receiving the data from the communications devices. The wireless access interface provides a first primary carrier within a first frequency range, which forms a primary cell providing a contiguous set of communications resources across the first frequency range. The controller is configured in combination with the receiver and transmitter to receive from one or more of the communications devices a channel state report for each of one or more predefined candidate channels within a second frequency range which is different to and mutually exclusive from the first frequency range, each of the candidate channels in the second frequency range representing a minimum unit of communications resource which can be used to receive data on the downlink. The candidate channels may be candidate carriers providing the minimum unit of communications resources such as a plurality of resource blocks or sub-carriers.

The controller is configured to select, from the one or more candidate carriers, one or more component carriers for use in transmitting signals to the communications devices within the second frequency range to form a down-link providing a secondary cell, based on the received channel state reports, and to transmit an indication identifying the selected one or more component carriers to the one or more communications devices for use in transmitting signals to the one or more communications devices via the second frequency range.

Accordingly an arrangement is provided in which an infrastructure equipment can identify suitable channels or carriers with a second frequency band, which may be license exempt using channel state measurements received from and generated by communications devices, which are capable of operating in both the first frequency band and the second frequency band.

According to one example the infrastructure equipment is configured to compared the channel state reports with a schedule of down-link transmission which have been made by the infrastructure equipment in order to identify those channel state reports which have been generated from signals transmitted in candidate channels by itself. As such, only the channel state reports for candidate channels, which are not currently being used by the infrastructure equipment can be identified and assessed as to whether or not the interference from other sources is low enough to allow the candidate channel to be used as a component carrier of the secondary cell.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
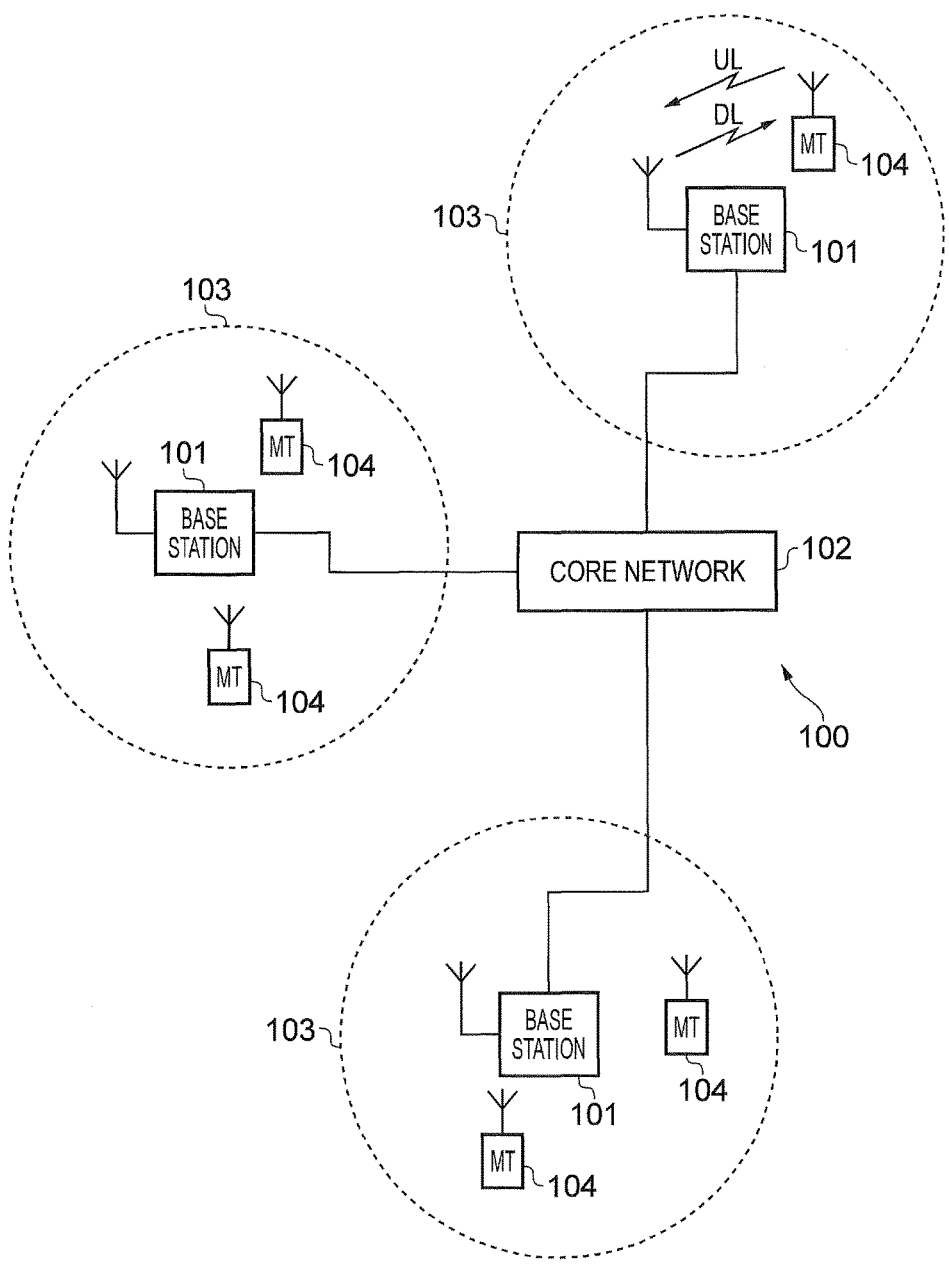
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP®body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/nodeBs/e-nodeBs, and so forth.

Figure 2:
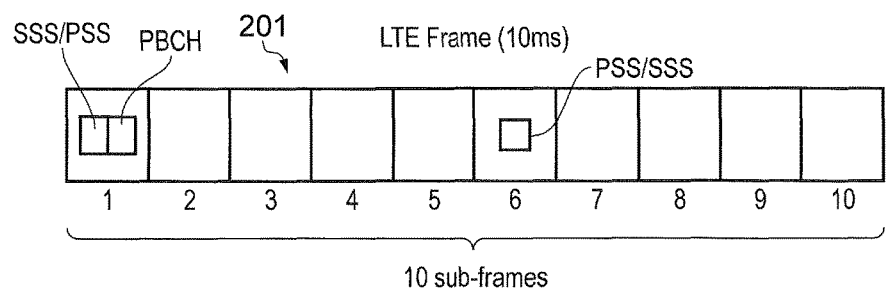
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
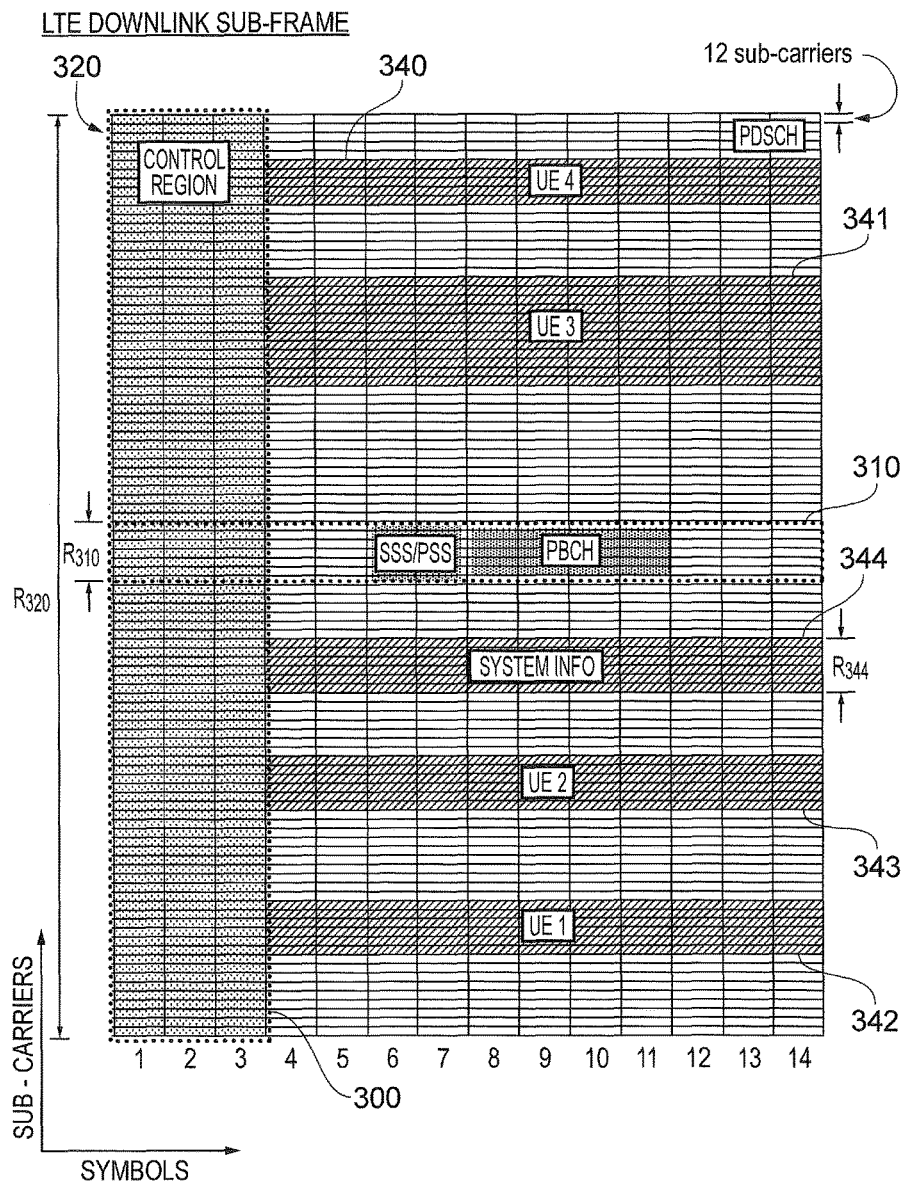
FIG. 3 provides a schematic diagram illustrating an example of a LTE downlink radio subframe.

FIG. 3 is a schematic diagram of a grid, which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licenced for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE devices 340, 341, 342, 343. For example, the resource allocation 342 for a first LTE device (UE 1) extends over five blocks of twelve subcarriers (i.e. 60 subcarriers), the resource allocation 343 for a second LTE device (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information, which may be in addition to that transmitted on other physical layer control channels.

PDCCH and EPDCCH contain control data indicating which subcarriers of the subframe have been allocated to specific devices (or all devices or subset of devices). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE communications device to achieve frame synchronisation and determine the physical layer cell identity of the enhanced Node B transmitting the downlink signal. The PBCH carries information about the cell, comprising a master information block (MIB) that includes parameters that LTE devices use to properly access the cell. Data transmitted to devices on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the communications devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator, while other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a communications device to be made using more than one carrier. This can increase the maximum data rate that may be achieved between a base station and a communications device as compared to when using only one carrier and can help make enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-01)/3GPP TS 36.211 version 11.5.0 Release 11 [2], ETSI TS 136 212 V11.4.0 (2014-01)/3GPP TS 36.212 version 11.4.0 Release 11 [3]; ETSI TS 136 213 V11.6.0 (2014-03)/3GPP TS 36.213 version 11.6.0 Release 11 [4]; ETSI TS 136 321 V11.5.0 (2014-03)/3GPP TS 36.321 version 11.5.0 Release 11 [5]; and ETSI TS 136 331 V11.7.0 (2014-03)/3GPP TS 36.331 version 11.7.0 Release 11 [6].

In accordance with the terminology and implementation used for carrier aggregation in the context of an LTE-based system, a cell is denoted the 'Pcell', or Pcell, for a communications device if it is the cell that is initially configured during connection setup for the communications device. Thus the Pcell handles RRC (radio resource control) connection establishment/re-establishment for the communications device. The Pcell is associated with a downlink component carrier and an uplink component carrier (CoC). These may sometimes be referred to herein as primary component carriers. A cell that is configured for use by the communications device after initial connection establishment on the Pcell is termed a 'Scell', or Scell. Thus the Scells are configured after connections establishment to provide additional radio resources. The carriers associated with Scells may sometimes be referred to herein as secondary component carriers. During a phase in which the infrastructure equipment is identifying the component carriers, from a plurality of predefined candidate carriers, one or more of which may be selected as component carriers. Since in LTE up to five component carriers can be aggregated, up to four Scells (correspondingly associated with up to four secondary component carriers) can be configured for aggregation with the Pcell (associated with the primary component carrier). An Scell might not have both a downlink and uplink component carrier and the association between uplink component carriers and downlink component carriers is signalled in SIB2 on each downlink component carrier. The associations between UL component carriers and DL component carriers is signalled in SIB2 on each DL component carrier. The Pcell supports PDCCH and PDSCH on downlink and PUSCH and PUCCH on uplink whereas the Scell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the communications device. An Scells for a communications device may also be deactivated automatically (time out) if the communications device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to communications devices which are not being cross-carrier scheduled as they will decode the actual PCFICH. If more OFDM symbols actually used for the control region, there will be some degree of performance degradation for the cross-carrier scheduled communications devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the communications device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth bandwidth, are handled using a modified handover procedure. The source Pcell passes all the relevant carrier aggregation (CA) information to the target Pcell so the communications device can begin to use all the assigned component carriers when handover is complete.

Random access procedures are primarily handled on the uplink component carrier of Pcell for a communications device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for exclusive use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating quantity same technology, or systems operating according to different technologies, such as Wi-Fi or Bluetooth.

Figure 4:
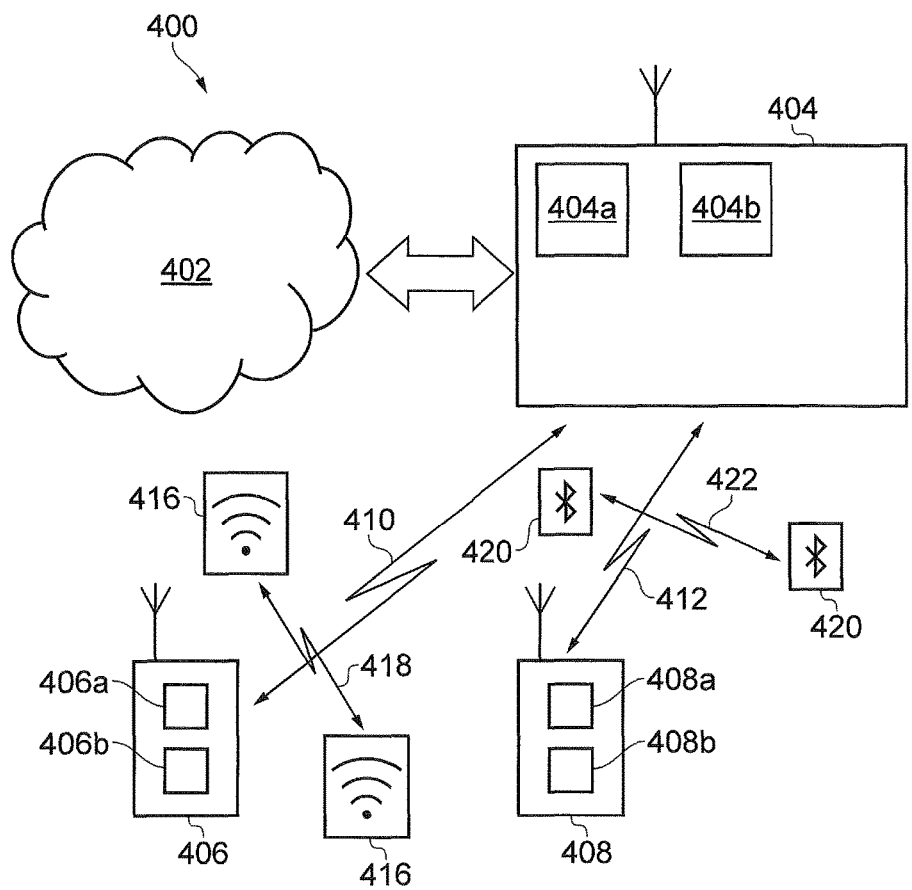
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first communications device 406 and a second communications device 408. It will of course be appreciated that in practice the radio network part may comprise a plurality of base stations serving a larger number of communications devices across various communication cells. However, only a single base station and two communications devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the communications devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the communications devices in the telecommunications system 400 via the base station 404. In order to maintain mobility management and connectivity, the core network part 402 also includes a mobility management entity (not shown) which manages the enhanced packet service, EPS, connections with the communications devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The communications devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the communications devices 406, 408, their respective transceiver units 406a, 408a and controller units 406b, 408b are schematically shown in FIG. 4 as separate elements for ease of representation. However, it will be appreciated that for each communications device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the communications devices 406, 408 will in general comprise various other elements associated with their operating functionality in accordance with established wireless telecommunications techniques (e.g. a power source, possibly a user interface, and so forth).

As has become commonplace in the field of wireless telecommunications, communications devices may support Wi-Fi and Bluetooth functionality in addition to cellular/mobile telecommunications functionality. Thus the transceiver units 406*a*, 408*a* of the respective communications devices may comprise functional modules operable according to different wireless communications operating standards. For example, the communications device' transceiver units may comprise an LTE transceiver module for supporting wireless communications in accordance with an LTE-based operating standard, and may further comprise a WLAN transceiver module for supporting wireless communications in accordance with a WLAN operating standard (e.g. a Wi-Fi standard), and also a Bluetooth transceiver module for supporting wireless communications in accordance with a Bluetooth operating standard. The underlying functionality of the different transceiver modules may be provided in accordance with conventional techniques. For example, a communications device may have separate hardware elements to provide the functionality of each transceiver module, or alternatively, a communications device might comprise at least some hardware elements which are configurable to provide some or all functionality of multiple transceiver modules. Thus the transceiver units 406*a*, 408*a* of the communications devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404*a* for transmission and reception of wireless signals and a controller unit 404*b* configured to control the base station 404. The controller unit 404*b* may comprise a processor unit which is suitably configured/programmed to provide the desired functionality described herein using conventional programming/configuration techniques for equipment in wireless telecommunications systems. The transceiver unit 404*a* and the controller unit 404*b* are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404*b*.

Thus, the base station 404 is configured to communicate data with the first and second communications devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers, for each radio communication link may comprise example a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with communications devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation on the unlicensed frequency band may be referred to as an LTE-U mode of operation. The first (licenced) frequency band may be referred to as an LTE band (or more particularly an LTE-A band) and the second (unlicensed) frequency band may be referred to as an LTE-U band. Resources on the LTE-U band may be referred to as U-resources. A communications device able to make use of U-resources may be referred to as a U-communications device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without any centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be permitted in accordance with known techniques.

Modes of operation for the wireless telecommunications network 400 represented in FIG. 4 in accordance with certain embodiments of the disclosure will now be described. The general scenario for these embodiments is one in which a carrier aggregation capable communications device is operating in an LTE-A cell as normal and the base station determines that it should configure the LTE-U capable communications device with an additional aggregated carrier using the LTE-U resources. The specific reason why the base station determines that it should configure a particular communications device for LTE-U based carrier aggregation is not significant. Thus the LTE-A carrier provides a Pcell for the communications device and the LTE-U resources provide one or more Scell(s) for the communications device. It will be appreciated the LTE-A resources may also be used to provide component carriers associated with one or more further Scells(s) in accordance with conventional carrier aggregation technique. For the examples described with reference to FIG. 4, the LTE-A transmissions in the licenced frequency band and the LTE-U transmissions in the unlicensed frequency band, and thus the Pcell and Scell(s), are both made from the same base station 504, but this may not be the case in other example embodiments. The LTE-U carrier could in general be utilised with a TDD (time division duplex) or FDD (frequency division duplex) frame structures. However, a consequence of some aspects of existing regulatory restrictions on unlicensed spectrum usage in some regions means that TDD may be, at least currently, more likely, or alternatively downlink-only FDD operation.

Interference Estimation on LTE-U Band

Embodiments of the present technique concern an arrangement in which a UE which is configured to communicate via an unlicensed or licensed exempt LTE frequency band forming a Scell communicates an indication of interference using channel state reports to an infrastructure equipment providing the Pcell so that the infrastructure equipment can identify interference in the unlicensed Scell and therefore identify carriers for aggregating in the Scell.

As mentioned above, the second or license exempt frequency band may be formed from component carriers. However because the second frequency band is license exempt, other systems may use the second frequency band and so may transmit interfering signals. As such the eNodeB may be configured in some embodiments to determine from a set of predefined candidate carriers, which of these candidate carriers can be used to form the secondary component carriers of the Scell. As explained below, according to the present technique a scheduler in the eNodeB, which may form part of the control unit 404b controls activation and de-activation of Scells, and component carriers within the Scells by sending MAC messages to the UE, or an Scell may 'time-out' if no PDCCH is received before a related timer expires. In order to identify the component carriers from the available candidate carriers the eNodeB collates channel state reports from the UEs and compares the channel state reports with the candidate carriers from which they were gathered to determine whether any of these candidate carriers were already being used by the eNode on the Scell. If these were being used by the eNodeB, then the eNodeB, determines that the corresponding channel state reports are not relevant, but other channel state reports on other candidate carriers provide a relative measure of interference on these candidate carriers. Accordingly, if a channel state report indicates that the interference is relatively low for a candidate carrier then this can be used as one of the component carriers.

Figure 5:
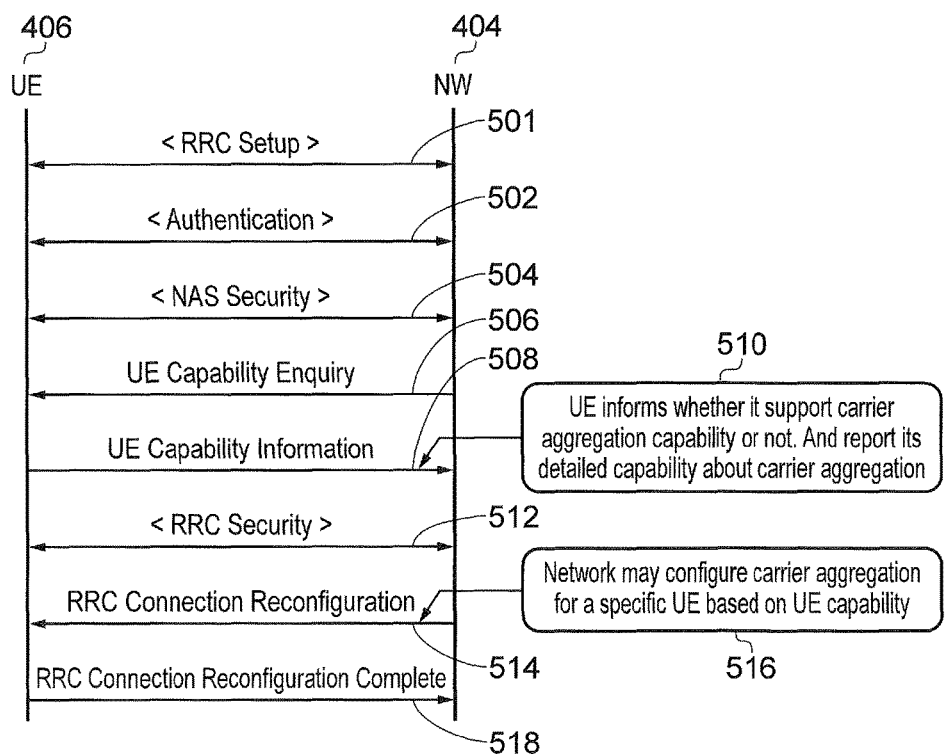
FIG. 5 provides an example signal flow diagram representing a message exchange between a communications device and a mobile network.

FIG. 5 provides an example illustration of a message flow between a UE 406 and the network which may include the e-NodeB 404 but other elements also present in the network which are required for establishing a carrier aggregated Scell is configured for the UE 406. As will be appreciated a process in which a UE establishes a connection which utilises communications resources on a second frequency band that is unlicensed requires some adaptation with respect to a conventional arrangement in which communications resources are provided by the licensed frequency band or a Pcell. In FIG. 5 in a first message exchange 501 the UE establishes a radio resource connection (RRC) set up establishment procedure. In a message exchange 502 the UE is authenticated by the network. Following the authentication there is an exchange of Non Access Stratum (NAS) security information in a message exchange 504. The network then sends an enquiry to the UE to establish the UE's capability and in particular whether the UE is able to utilise carrier aggregation provided by an unlicensed (LTE-U) band 506. With a message 508 the UE communicates its capability to the network. As shown in box 510, the UE provides an indication to the network of whether the UE can support carrier aggregation or not. The UE then reports its detailed capability about the carrier aggregation. In a message exchange 512 the UE and the network exchange RRC security information and in a message 514 the network signals RRC connection reconfiguration. According to the reconfiguration as shown in box 516 the network may configure the carrier aggregation for a specific UE based on its capability. In a message 518 the RRC connection reconfiguration is indicated by the UE as being complete.

In order for the control unit 404b to schedule resources in the Scell, the control unit 404b should be provided with measurements which identify interfering signals which are being transmitted by other sources in the unlicensed frequency band in which the Scell is formed. For example, downlink channel-dependent scheduling is a feature of LTE. The control unit 404b, which forms the eNodeB scheduler is configured to assign resources to the UE in downlink subframes partly supported by information the eNodeB receives from the UE on the downlink channel quality. The downlink channel measurements are provided by the UEs as channel-state reports which they submit usually in a periodic fashion, but the network may also request aperiodic channel-state reports. The channel-state reports consist of one or more pieces of information:

Rank indication (RI)
Precoder matrix indication (PMI)
Channel quality indication (CQI)

Together, the combination of the above three indicators constitutes a channel-state report. RI and PMI are only reported if the UE is in a spatial-multiplexing transmission mode. The channel-state report is also only a recommendation to the eNodeB which is free to make downlink scheduling assignments through ignoring some of the recommendations or adjust the values thereof.

Aperiodic reports, which are explicitly requested by the network, are always delivered on the PUSCH, i.e. on a resource that is dynamically assigned for the UE for that purpose.

Periodic reports are configured by the network to be delivered with a given periodicity on a semi-statically configured PUCCH resource in uplink. If the UE has a valid uplink grant, it would deliver the report on PUSCH, but normally on PUCCH as mentioned.

The UE may report in two periodic reporting modes. Wideband reports reflect the average channel quality across the entire channel bandwidth with a single CQI value. For UE selected reports, the principle is different, and the bandwidth is divided into bandwidth parts, the number of which parts is derived from the cell bandwidth. For each bandwidth part the UE selects the best sub-band (four to eight physical resource blocks in size) and cycles through each bandwidth part and best sub-band for the bandwidth part in subsequent reporting periods in uplink. The wideband report is provided on each periodic reporting occasion.

TABLE 1

Periodic and aperiodic channel information feedback reporting [1]

| | Periodic reporting | Aperiodic reporting |
|---|---|---|
| When to send | Periodically every 2-160 ms | When requested by the eNodeB |
| Where to send | Normally on PUCCH, PUSCH used when multiplexed with UL data | Always on PUSCH |

TABLE 1-continued

Periodic and aperiodic channel information feedback reporting [1]

| | Periodic reporting | Aperiodic reporting |
|---|---|---|
| Payload size of the reports | 4-11 bits | Up to 64 bits |
| Channel coding | Linear block codes | Tail-biting convolutional codes |
| CRC protection | No | 8-bit CRC |
| Rank Indicator | Sent in a separate subframe at lower periodicity | Sent separately encoded in the same subframe |
| Frequency selectivity of the CQI | Only very limited amount of frequency information | Detailed frequency selective reports are possible |
| Frequency selectivity of the PMI | Only wideband PMI | Frequency selective PMI reports are possible |

TABLE 2

4-bit CQI table (from TS36.213)

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 6:
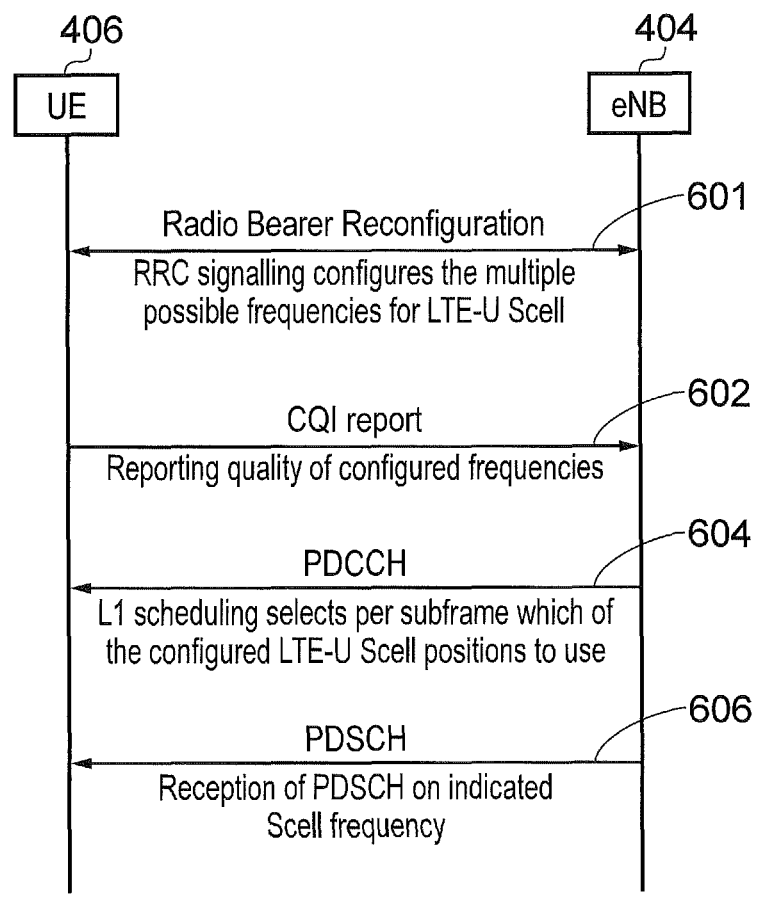
FIG. 6 provides an example signal flow diagram illustrating a message exchange between a communications device and a mobile network for reporting a channel state report for a candidate channel/carrier.

FIG. 6 provides an example message flow diagram illustrating a process in which a UE 406 performs measurements of received signals in respective candidate carrier frequencies in the Scell and transmits the measured interference to the eNodeB 404 for use in identifying carriers which are not available. In FIG. 6, a first double headed arrow 601 represents an exchange of messages and a process in which an RRC configuration is performed to reconfigure a radio bearer for the UE 406 to access multiple component carriers in the Scell for LTE-U as well as the Pcell. A second message arrow represents a transmission by the UE 406 of the channel state report, as for example a CQI report, for each of one or more candidate channels or carriers within the Scell, which the eNodeB 404 could use in the LTE-U band depending on whether these channels or carriers are already experiencing interference. After analyzing the channel state reports, the eNodeB identifies from the candidate channels or carriers, the component channels or carriers which can be used because they are sufficiently clear of interference, and transmits a signaling message 604 (layer 1 (L1)) in each sub-frame to direct the UE 406 to shared resources within the LTE-U Scell which can be used to receive data on the down-link from the eNodeB 404, which is represented by a message arrow 606.

A UE 404 receiving LTE-U signal in downlink of a Scell deployed in an un-licensed or licence-exempt band such as LTE-U may be configured in accordance with the present technique to receive down-link signals differently to a conventional UE receiving down-link signals from a licensed frequency band. For example, common and dedicated physical channels that the eNodeB would be transmitting are not always present. This is due to the need for politeness protocols which allow other licence-exempt users to access the license-exempt band for other systems. This may require for example that the eNodeB stops transmitting for certain periods of time and for certain carrier frequencies. Furthermore, as a result of the other non-coordinated interfering systems and the need for politeness protocols, a synchronized frame and subframe timing with that of conventional LTE connection cannot be guaranteed. This is because although a eNodeB can transmit down-link frames in specific resources which are available, a lack of signaling co-ordination provided by information transmitted in a PSS/SSS in a component carrier of the SCell, results in the UEs being un-aware of the frame and sub-frame synchronization for the Scell.

These differences from a conventional operation outlined above can make it difficult for a UE to accurately synchronize to and monitor the LTE-U downlink. However, the UE is still obliged to make measurements and report those measurements to the eNodeB for scheduling purposes. The challenge of synchronization is made easier in co-located scenarios where the LTE "main band" signal is transmitted from the same eNodeB site as the LTE-U downlink signal. Despite the different carrier frequency used, it is safe to expect that the arrival times of subframes transmitted at the same instant at the eNodeB antenna connector will be received closely aligned at the UE antenna connector. This fact can remove the need for specific synchronization signals that allow establishing synchronisation for each individual packet sent in downlink over LTE-U interface (compared to WiFi).

Figure 7:
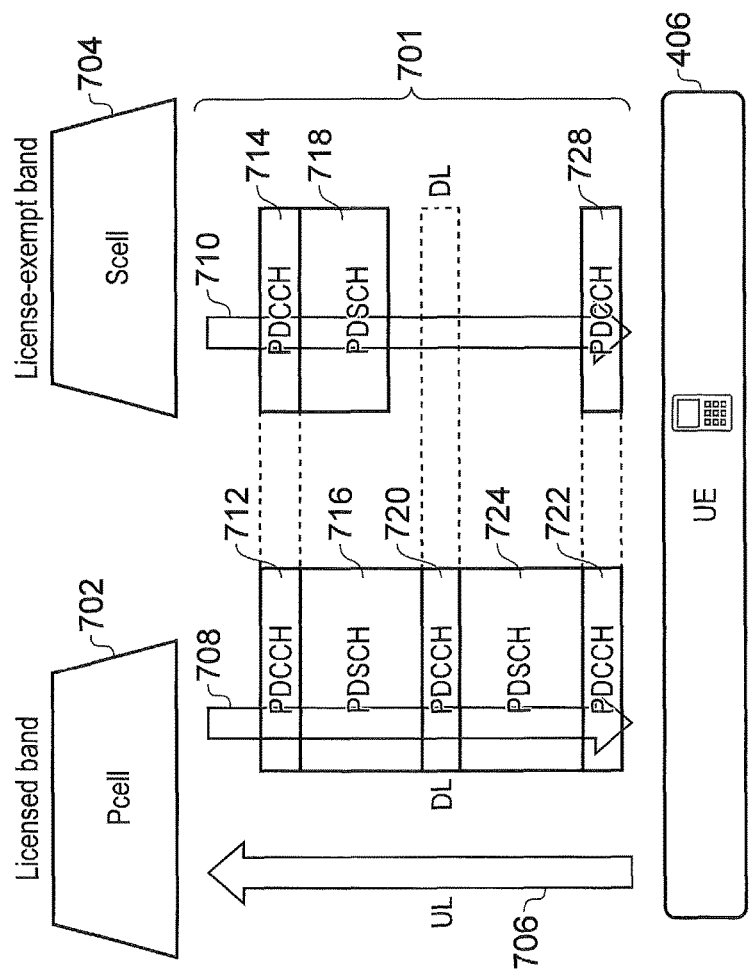
FIG. 7 is a schematic block diagram illustrating an example of a co-located primary cell and secondary cell for which a frame structure for control and shared channels are synchronised.

With the frame and subframe synchronization established from the LTE downlink the UE is simultaneously receiving over the operator's licensed band (first frequency band), the frame structure over Pcell and Scell may be considered as presented in FIG. 7.

As shown in FIG. 7, a UE is configured to communicate via a wireless access interface 701 which includes a Pcell 702 and a Scell 704 which may be served by the same eNodeB. As shown in FIG. 7 the UE 406 communicates signalling messages to the eNodeB via an uplink 706 of the Pcell 702 but can receive downlink information via either the Pcell 708 or the Scell 710. As shown in FIG. 7 and in correspondence with the LTE downlink diagram shown in FIG. 3, the LTE downlink 708, 710 comprises a PDCCH 712, 714 and a PDSCH 716, 718. Depending on the availability of candidate carriers within the Scell of the unlicensed LTE band the number of shared channel PDSCH and control channel PDCCH resources on the Scell of the downlink 710 may be less than that provided on the Pcell 708 so that the Pcell may include further PDCCH resources 720, 722 and shared channel resources PDSCH 724. However as illustrated in FIG. 7 the downlink channels generally for the Scell and the Pcell 702, 704 are synchronised with each other particularly for example where the LTE and LTEU bands are collocated that is served by the same infrastructure equipment.

Embodiments of the present technique can provide an arrangement in which channel state reports are generated by a UE and in which the UE measures RSSI and RSRP (full bandwidth received power). RSSI is estimated from cell-specific reference symbols occupying the complete LTE bandwidth. In some LTE systems, the introduction of CSI Reference Signals complements the cell-specific reference signals, and both may be used for measurement purposes. In the absence of reference symbols, the only signals present would be potential WiFi and other non-3GPP RAT traffic or other LTE-U signals (from other operators). The UE measuring full BW received power (RSRP) would again report this to the eNodeB, but the meaning is different.

The eNodeB has allocated a first licence-exempt (LE) (carrier-aggregated Scell) band to a UE, which is making measurements in a normal fashion on it. There are other UEs on (potentially) other LE bands, which are different from the first band. The eNodeB would preferably schedule the UEs on bands, which have less interfering traffic, such as LTE-U UEs on other MNO networks and WiFi and other non-3GPP RAT devices.

Figure 8:
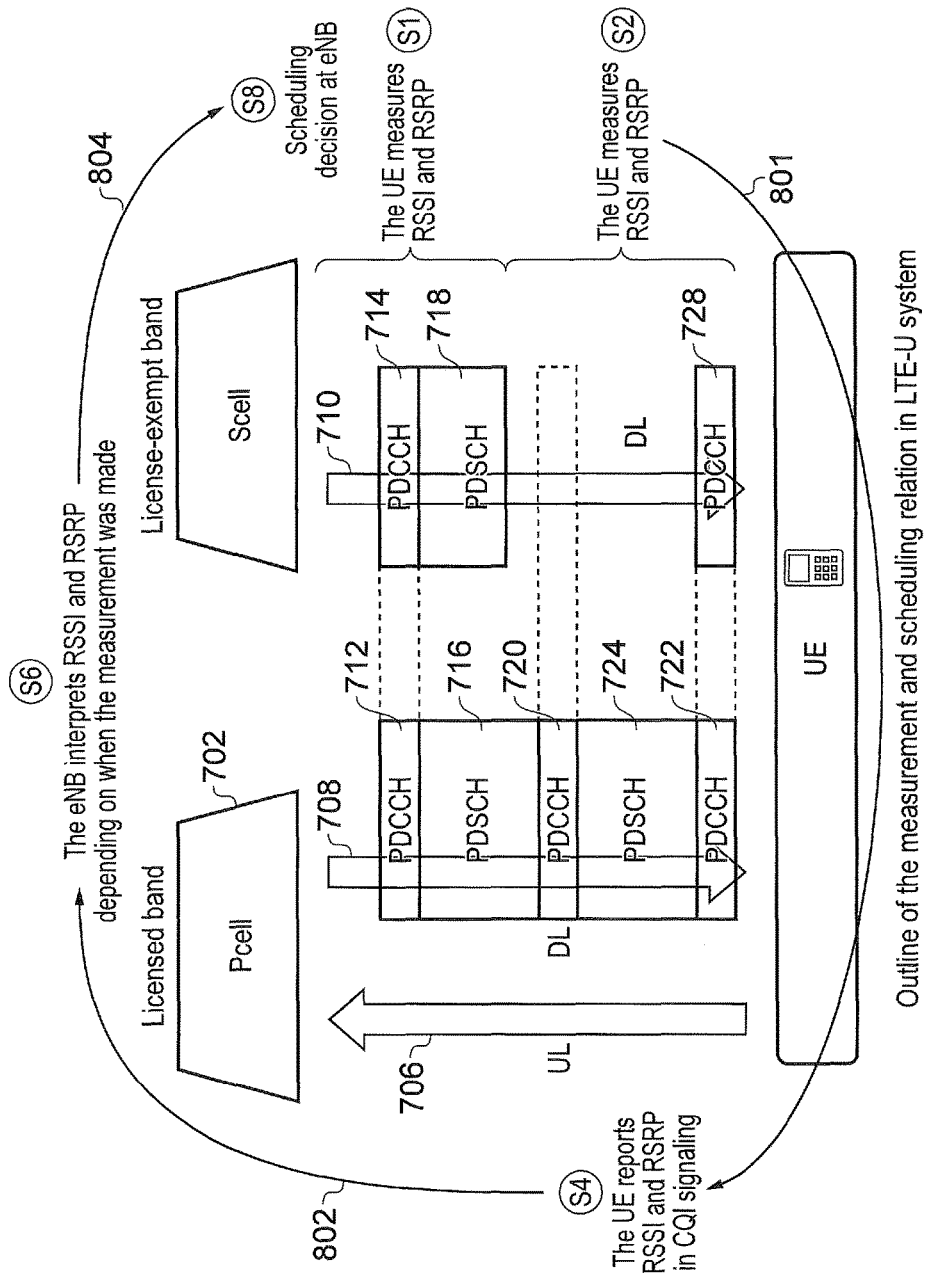
FIG. 8 is a part schematic block diagram part flow diagram illustrating a sequence of process steps in which measurement established by a communications device from a secondary cell are reported on the up-link of a primary cell.

FIG. 8 provides an example illustration of an embodiment of the present technique in which a UE reports measurements of interference on the downlink of the Scell via the uplink of the Pcell. FIG. 8 corresponds to the diagram shown in FIG. 7 and so corresponding parts bear the same numerical references. As shown in FIG. 8, a UE which performs measurements to establish a channel state estimate for each of the candidate carriers on an Scell performs measurements of the RSSI and RSRP in a first step S1. In a second step, S2, the UE also measures other parts of the downlink channel measuring the RSSI and RSRP of other shared communications resources, which are available on the Scell. As illustrated by an arrow 801 the UE then transmits the measurements on the uplink 706 of the Pcell in step S4 to report the RSSI and RSRP measurements as CQI signalling indications to the e-NodeB. The transmission of the CQI signalling is represented by 802. In step S6 the eNodeB interprets the RSSI and RSRP measurements depending on when the measurements were made in order to identify whether the measurements represent interference transmissions from other communications on the unlicensed band of the Scell or whether the interference measured was from transmissions by the e-NodeB itself to other UE's. Accordingly channel state measurements made by the UE for candidate carriers which are currently being used for downlink transmissions by the eNode just represent the presence of signals transmitted in the LTE-U band by the e-NodeB itself. Accordingly as represented by arrow 804 the UE proceeds to process the information received from the UE to perform scheduling of the resources on the Scell in the unlicensed LTE-U band in step S08.

According to the process represented in FIG. 8, for each reporting period a channel state report which includes a CQI is generated and sent to the eNodeB:

When LTE-U DL signal is present: wideband received power indicates LTE DL quality according to a conventional arrangement;

When LTE-U DL signal is not present: wideband received power indicates the level of other traffic Since the eNodeB has full knowledge when it transmitted LTE-U signal, it can implicitly determine whether the channel state report was done on LTE-U waveform or on "interference".

This information can be used to estimate the occupancy of the respective downlink band. The combination of measurement reports from several UEs from several bands establishes the "occupancy status" of each LTE-U band that the eNodeB has assigned. This way the eNodeB can schedule LTE-U UEs into those bands that suffer less from interference from LTE-U UEs on other MNO networks and WiFi and other non-3GPP RAT devices.

The eNodeB would accumulate N CQI reports from one UE to establish a statistically reliable estimate of the interference level at the served Scell. This estimate of the LTE-U band interference status would be updated by dropping old CQI reports out of the calculation when new reports arrive. An easy way of doing this is through calculating a weighted mean of CQI values $\{x_1, x_2, \ldots, x_n\}$ collected over a window of n samples.

$$\bar{x} = \sum_{i=1}^{n} w_i x_i$$

Figure 9:
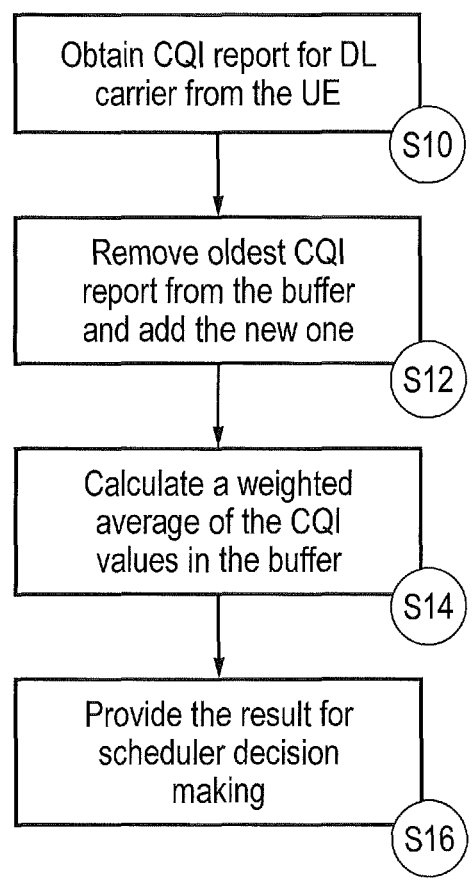
FIG. 9 is an example flow diagram illustrating a process of generating channel state reports in the form of CQI measurements.

According to the present technique a UE operates in order to provide a channel state report for a candidate carrier report to the network as represented in FIG. 9. According to one embodiment the eNodeB first obtains channel state information such as CQI information that a UE measured across the downlink channel of the LTE-U band providing the Scell in step S10. As will be appreciated a UE does not know whether the signals detected during a measurement period were signals transmitted by an eNodeB and therefore were LTE-U waveform on or not. Even when it has no data scheduled, other UEs may receive data from an PDSCH from the eNodeB. The channel state reporting is therefore provided from the UE, which is un-aware of what signals were transmitted in downlink over SCell. However the eNodeB can determine whether the channel state report relates to "normal CQI" and "interference measurement". In step S12 the eNodeB removes the older CQI report from the buffer and adds a new one just measured. In step S14 the eNodeB calculates a weighted average of the CQI measurements values in the buffer. The measurement values are related to the frequency of the candidate carrier or channel, which has been measured. The results are then provided to the eNodeB scheduler for further decision making in step S16.

Figure 10:
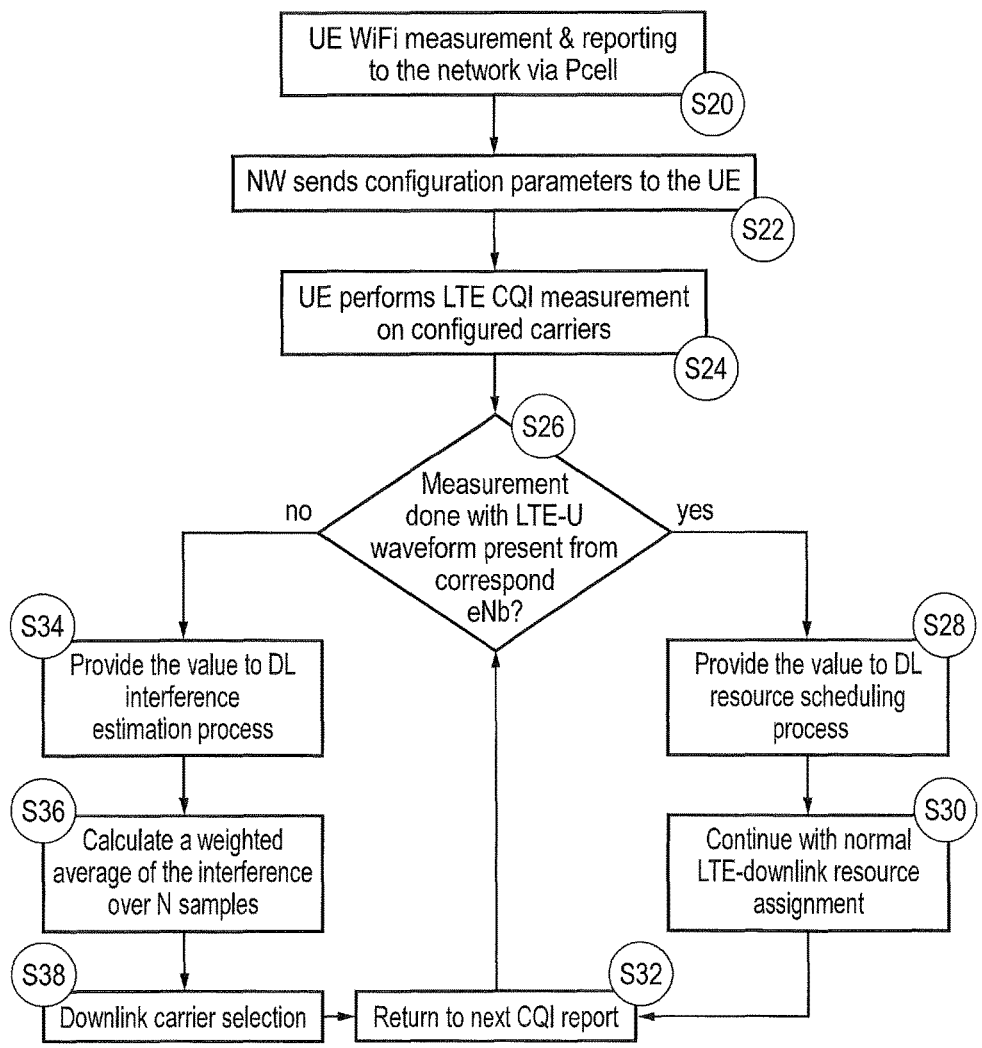
FIG. 10 is an example flow diagram illustrating a process in which a communications device provides channel state information for candidate channels/carriers and in which an infrastructure equipment selects component channels/carriers of the secondary cell based upon the reported measurements.

A flow diagram illustrating an example operation of embodiments of the present technique is provided in FIG. 10. The flow diagram of FIG. 10 is summarised as follows:

S20: The UE performs WiFi measurements and reports the channel state measurements resulting from the derived measurements to the network via the Pcell.

S22: The network sends configuration parameters to the UE in order to configure the operation of the UE on the downlink wireless access interface of the Scell.

S24: The UE then performs LTE CQI measurements on the configured carriers.

S26: At a decision point S26 the eNodeB determines whether the measurements done and reported to it by the UE were performed on the LTE-U waveform from the eNodeB or whether these are interfering signals.

S28: If the CQI measurements were received and measured by a UE on downlink resources which were scheduled by the eNodeB, then the CQI measurement represents instantaneous downlink LTE channel conditions. The CQI measurement is provided to the downlink scheduling processor of the eNodeB.

S30: The scheduler proceeds to operate as normal with LTE downlink resource assignment using the CQI measurements provided. Processing then proceeds to step S32 where the UE returns to CQI measurement reporting.

S34: In contrast if the measurements were performed in the LTE band where the eNodeB has not scheduled transmissions then the measured CQI value represents downlink interference. The downlink interference is therefore estimated based on the CQI measurement received for this carrier.

S36: The eNodeB then calculates a weighted average of interference over a number of samples and in step S38 the measured interference is fed back to the scheduler in order to schedule downlink carrier selection. Processing then proceeds to step S32.

According to one example embodiment of the present technique, the following operations are performed:
1. UE performs Wi-Fi measurements (e.g. 5 MHz band scan using wi-fi module)
2. UE reports channel occupancy report to the network over LTE uplink in PCell.
3. NW decides configuration based on this report and informs UE via RRC configuration (validity timer starts)
4. CQI reporting of configured LTE channel (e.g. normal SCell operation on an LTE-U carrier)
5. eNodeB CQI report.
   If the measured RSSI corresponds to a signal transmitted from the eNodeB then the eNodeB can evaluate the instantaneous downlink channel conditions.
   If the measured RSSI corresponds to a measurement when the eNodeB did not transmit any resource block in the scheduled resource allocation, the received signal strength corresponds to interference caused by other traffic. Based on accumulated CQI reports from the different UEs the eNodeB can estimate the interference for different LTE-U bands and allocate traffic to the most suitable bands.

According to the above description, it will be appreciated that embodiments of the present technique can provide the following advantages:
An eNodeB can make better estimates of downlink interference in the LTE-U cell from the channel quality reports that UEs send to it.
An eNodeB scheduler can more effectively assign the LTE-U UEs to bands that suffer from the least interference
Control of LTE-U resources allocation can be achieved such that a likelihood of interference to other systems can be reduced or avoided.

It will be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which is the wireless telecommunications system does not have exclusive access. In many implementations this will correspond with a licence exempt frequency band. However, in other implementations the operation may be applied in a frequency band which is not unlicensed in the strict administrative sense, but which is nonetheless available for opportunistic use by devices operating according to different wireless access technologies (e.g. LTE-based, Wi-Fi-based and/or Bluetooth-based technologies) and/or multiple networks operating according to the same technology (e.g. LTE-based wireless communication systems provided by different network operators). In this regard the terminology such as "unlicensed frequency band" you'd hearing may be considered to refer more generally to a frequency band in which resources are shared by different wireless communications systems. Accordingly, while the term "unlicensed" is commonly used to refer to these types of frequency bands, in some deployment scenarios an operator of a wireless telecommunications system may nonetheless be required to hold an administrative license to operate in these frequency bands.

Thus there has been described an infrastructure equipment forming part of a mobile communications network transmits data to or receives data from communications devices. The infrastructure equipment comprises a transmitter configured to transmit the signals to communications devices via a wireless access interface, a receiver configured to receive the signals from the communications devices via the wireless access interface, and a controller for controlling the transmitter and the receiver to form the wireless access interface for transmitting to the communications devices and receiving the data from the communications devices. The wireless access interface providing a first primary carrier within a first frequency range, which forms a primary cell providing a contiguous set of communications resources across the first frequency range. The controller is configured in combination with the receiver and transmitter to receive from one or more of the communications devices a channel state report for each of one or more predefined candidate channels within a second frequency range which is different to and mutually exclusive from the first frequency range, each of the candidate channels in the second frequency range representing a minimum unit of communications resource which can be used to receive data on the downlink. The controller is configured to select, from the one or more candidate carriers, one or more component carriers for use in transmitting signals to the communications devices within the second frequency range to form a down-link providing a secondary cell, based on the received channel state reports, and to transmit an indication identifying the selected one or more component carriers to the one or more communications devices for use in transmitting signals to the one or more communications devices via the second frequency range. Accordingly an arrangement is provided in which an infrastructure equipment can identify suitable channels or carriers with a second frequency band, which may be license exempt using channel state measurements received from and generated by communications devices, which are capable of operating in both the first frequency band and the second frequency band.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective Features of the Present Disclosure are Defined by the Following Numbered Paragraphs:

1. A communications device for transmitting data to or receiving data from a mobile communications network, the mobile communications network including infrastructure equipment, the infrastructure equipment providing a wireless access interface for transmitting signals to or receiving signals from the communications device, the communications device comprising:
   a transmitter configured to transmit the signals to the infrastructure equipment via the wireless access interface,
   a receiver configured to receive the signals from the infrastructure equipment via the wireless access interface, and
   a controller for controlling the transmitter and the receiver to receive data transmitted to the communications device from the infrastructure equipment via the wireless access interface, the wireless access interface providing a primary carrier within a first frequency range, which forms a primary cell providing a contiguous set of communications resources across the first frequency range and providing one or more control channels for transmitting signaling message to the communications device or receiving signaling messages from the infrastructure equipment, wherein the controller is configured in combination with the receiver and transmitter
   to detect signals received within one or more predefined candidate channels within a second frequency range which is different to and mutually exclusive from the first frequency range, each of the candidate channels in the second frequency range representing a minimum unit of communications resource which can be used to receive data on the downlink,
   to generate, for each candidate channel, a channel state report from the determined relative strength of the signals received in each of the candidate channels,
   to transmit the channel state report for each of the candidate channels to the infrastructure equipment, and
   to receive an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel state report of each of the plurality of candidate channels.

2. A communications device according to clause 1, wherein the controller is configured in combination with the receiver and the transmitter
   to transmit the one or more channel state reports to the infrastructure equipment via the first frequency band providing the primary cell,
   to receive the indication of the selected one or more component channels, which have been selected by the infrastructure equipment by determining, from the generated channel state report for each of the one or more candidate channels, a relative interference from other sources, the one or more selected component channels in the second frequency range being formed by the infrastructure equipment into the down-link channel to provide a secondary cell.

3. A communications device according to clause 1, wherein the controller is configured in combination with the receiver
   to receive signals representing the data transmitted by the infrastructure equipment from the communications resources provided from the one or more component channels of the second frequency range and component channels of the first frequency range.

4. A communications device according to any of clauses 1 to 3, wherein the controller is configured in combination with the receiver
   to determine a relative strength of the received signals detected within the plurality of candidate channels in the second frequency range, by comparing the strength of the received signals with respect to one or more predetermined thresholds, and
   to generate the channel state report from the comparison of the relative strength of the received signal and the one or more thresholds.

5. A communications device according to any of clauses 1 to 4, wherein the controller is configured in combination with the transmitter
   to transmit the data via the wireless access interface using the first frequency range of the primary cell, and
   to receive the data via the wireless access interface from the first frequency range of the primary cell or from the one or more selected component carrier of the second frequency range forming the secondary cell.

6. A communications device according to any of clauses 1 to 5, wherein the minimum resource allocation of the candidate channel comprises a segment of communications resource comprising one sub-carrier.

7. A communications device according to clause 1, wherein the minimum resource allocation of the candidate channel comprises a segment of communications resource comprising in frequency at least one physical resource block (PRB) of a wireless access interface.

8. A method of transmitting data to a mobile communications network from a communications device or receiving data from a mobile communications network at a communications device, the mobile communications network including an infrastructure equipment, the method comprising
   transmitting signals representing the data from the communications device to the infrastructure equipment via a wireless access interface provided by the infrastructure equipment,
   receiving signals representing the data at the communications device from the infrastructure equipment via the wireless access interface, and
   controlling the transmitting or the receiving the signals to transmit the data to the mobile communications network or to receive the data from the mobile communications network via the wireless access interface, the wireless access interface providing a primary carrier within a first frequency range, which forms a primary cell providing a contiguous set of communications resources across the first frequency range and providing one or more control channels for transmitting signaling message to the communications device or receiving signaling messages from the infrastructure equipment, wherein the controlling the transmitting the signals or receiving the signals includes detecting signals received within one or more predefined candidate channels within a second frequency range which is different to and mutually exclusive from the first frequency range, each of the candidate channels in the second frequency range representing a minimum unit of communications resource which can be used to receive data on the downlink, generating, for each of the one or candidate channels, a channel state report from the determined relative strength of the signals received in each of the plurality of candidate channels, transmitting the channel state report for each of the plurality candidate channels to the infrastructure equipment, and receiving an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel state report of each of the plurality of candidate channels.

9. A method according to clause 8, wherein the transmitting the channel state report for each of the plurality candidate channels to the infrastructure equipment comprises transmitting the one or more channel state reports to the infrastructure equipment via the first frequency band providing the primary cell, and the receiving the indication, from the infrastructure equipment of one or more component channels selected from the one or more candidate channels, comprises receiving the indication of the selected one or more component channels, which have been selected by the infrastructure equipment by determining, from the generated channel state report for each of the one or more candidate channels, a relative interference from other sources, the one or more selected component channels in the second frequency range being formed by the infrastructure equipment into the down-link channel to provide a secondary cell.

10. An infrastructure equipment forming part of a mobile communications network for transmitting data to or receiving data from communications devices, the infrastructure equipment comprising a transmitter configured to transmit the signals to communications devices via a wireless access interface, a receiver configured to receive the signals from the communications devices via the wireless access interface, and a controller for controlling the transmitter and the receiver to form the wireless access interface for transmitting to the communications devices and receiving the data from the communications devices, the wireless access interface providing a first primary carrier within a first frequency range, which forms a primary cell providing a contiguous set of communications resources across the first frequency range, wherein the controller is configured in combination with the receiver and transmitter to receive from one or more of the communications devices a channel state report for each of one or more predefined candidate channels within a second frequency range which is different to and mutually exclusive from the first frequency range, each of the candidate channels in the second frequency range representing a minimum unit of communications resource which can be used to receive data on the downlink, to select, from the one or more candidate carriers, one or more component carriers for use in transmitting signals to at least one of the communications devices within the second frequency range to form a down-link providing a secondary cell, for the one or more communications devices, based on the received channel state reports, and to transmit an indication identifying the selected one or more component channels to the at least one communications device for use in transmitting signals to the one or more communications devices via the second frequency range.

11. An infrastructure equipment according to clause 10, wherein the controller is configured in combination with the receiver and transmitter to select the one or more component channels by identifying, based on a schedule of down-link transmitted signals, in which the infrastructure equipment has transmitted down-link signals via the second frequency range, a sub-set of the plurality of candidate channels for which the channel state reports relate to signals received from sources other than the infrastructure equipment by the one or more communications devices, and selecting the one or more component channels using the channel state reports from the sub-set of the plurality of candidate channels in which the infrastructure equipment has not schedule down-link transmitted signal.

12. An infrastructure equipment according to clause 10 or 11, wherein the selected one or more component channels form one or more component carriers for the secondary cell.

13. An infrastructure equipment according to clause 10, 11 or 12, wherein the channel state reports are received from the communications devices on the up-link of the primary cell.

14. An infrastructure equipment according to any of clauses 10 to 13, wherein the channel state report for each candidate channel includes a channel quality measure, and the controller includes a memory, and the controller is configured to generate the channel quality measure for each of the candidate channels for each predetermined period, by storing one or more samples of an estimate channel quality measure, received from the one or more communications devices at different times within the predetermined period, and combining the one or more samples of the estimated channel quality measure to form the channel quality measure.

15. An infrastructure equipment according to any of clauses 10 to 14, wherein the one or more reporting communications devices which transmit the channel state reports to the infrastructure equipment are different to the at least one capable communications devices which receives the indication identifying the selected one or more component channels for use in receiving signals via the second frequency range.

16. A method of transmitting data to or receiving data from communications devices using an infrastructure equipment, which forms part of a mobile communications network, the method comprising transmitting the signals to communications devices via a wireless access interface, receiving the signals from the communications devices via the wireless access interface, and controlling the transmitting and the receiving to form the wireless access interface for transmitting the data to the communications devices and receiving the data from the communications devices, the wireless access interface providing a first primary carrier within a first frequency range, which forms a primary cell providing a contiguous set of communications resources across the first frequency range, wherein the transmitting the signals to the communications devices includes receiving from one or more of the communications devices a channel state report for each of one or more predefined candidate channels within a second frequency range which is different to and mutually exclusive from the first frequency range, each of the candidate channels in the second frequency range representing a minimum unit of communications resource which can be used to receive data on the downlink, selecting, from the one or more candidate carriers, one or more component carriers for use in transmitting signals to at least one of the communications devices within the second frequency range to form a down-link providing a secondary cell, for the at least one communications device, based on the received channel state reports, and transmitting an indication identifying the selected one or more component channels to the at least one communications device for use in transmitting signals to the one or more communications devices via the second frequency range.

17. A mobile communications network including an infrastructure equipment according to any of clauses 10 to 15.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V11.7.0 (2014-03)/3GPP TS 36.331 version 11.7.0 Release 11

What is claimed is:

1. A communication device for transmitting data to or receiving data from a mobile communication network, the mobile communication network including infrastructure equipment, the infrastructure equipment providing a wireless access interface for transmitting signals to or receiving signals from the communication device, the communication device comprising:

a transmitter configured to transmit signals to the infrastructure equipment via the wireless access interface,
a receiver configured to receive signals from the infrastructure equipment via the wireless access interface, and
a controller configured to control the transmitter and the receiver to receive data transmitted to the communication device from the infrastructure equipment via the wireless access interface, the wireless access interface providing a primary carrier within a first frequency range, which forms a primary cell providing a contiguous set of communication resources across the first frequency range and providing one or more control channels for transmitting signaling messages to the communication device or receiving signaling messages from the infrastructure equipment,
wherein the controller is configured, in combination with the receiver and transmitter, to
detect signals received within one or more predefined candidate channels within a second frequency range which is different to and mutually exclusive from the first frequency range, each one of the candidate channels in the second frequency range representing a minimum unit of communication resource which can be used to receive data on downlink,
generate, for each candidate channel, a channel state report from determined relative strength of the signals received in each of the candidate channels,
transmit the channel state report for each of the candidate channels to the infrastructure equipment,
receive an indication, from the infrastructure equipment, of one or more component channels selected from the one or more candidate channels from which the communication device can receive signals from the infrastructure equipment on the down-link, the one or more component channels having been selected from the predefined one or more candidate channels within the second frequency range using the channel state report of each of the plurality of candidate channels by interpreting each of the channel state report differently depending on when the relative strength of the signals is measured,
transmit the one or more channel state reports to the infrastructure equipment via the first frequency band providing the primary cell, and
receive the indication of the selected one or more component channels, which have been selected by the infrastructure equipment by determining, from the generated channel state report for each of the one or more candidate channels, a relative interference from other sources, the one or more selected component channels in the second frequency range being formed by the infrastructure equipment into the down-link channel to provide a secondary cell.

2. The communication device as claimed in claim 1, wherein the controller is configured, in combination with the receiver, to receive signals representing the data transmitted by the infrastructure equipment from the communication resources provided from the one or more component channels of the second frequency range and component channels of the first frequency range.

3. The communication device as claimed in claim 1, wherein the controller is configured, in combination with the receiver, to
determine a relative strength of the received signals detected within the plurality of candidate channels in the second frequency range, by comparing the strength of the received signals with respect to one or more predetermined thresholds, and
generate the channel state report from the comparison of the relative strength of the received signal and the one or more thresholds.

4. The communication device as claimed in claim 1, wherein the controller is configured, in combination with the transmitter, to
transmit the data via the wireless access interface using the first frequency range of the primary cell, and
receive the data via the wireless access interface from the first frequency range of the primary cell or from the one or more selected component carrier of the second frequency range forming the secondary cell.

5. The communication device as claimed in claim 1, wherein the minimum resource allocation of the candidate channel comprises a segment of communication resource comprising one sub-carrier.

6. The communication device as claimed in claim 1, wherein the minimum resource allocation of the candidate channel comprises a segment of communication resource comprising in frequency at least one physical resource block (PRB) of a wireless access interface.

7. The communication device as claimed in claim 1, wherein the one or more component channels is selected from the predefined one or more candidate channels within the second frequency range using the channel state report of each of the plurality of candidate channels by interpreting each of the channel state report differently depending on when the relative strength of the signals is measured in order to identify whether the measured relative strength of the signals represents interference transmissions from other communications on the predefined candidate channels within the second frequency range, or the measured relative strength of the signals represents transmissions from the infrastructure equipment to other communication devices.

8. A method of transmitting data to a mobile communication network from a communication device or receiving data from a mobile communication network at a communication device, the mobile communication network including an infrastructure equipment, the method comprising:

transmitting signals representing the data from the communication device to the infrastructure equipment via a wireless access interface provided by the infrastructure equipment, receiving signals representing the data at the communication device from the infrastructure equipment via the wireless access interface, and controlling the transmitting or the receiving the signals to transmit the data to the mobile communication network or to receive the data from the mobile communication network via the wireless access interface, the wireless access interface providing a primary carrier within a first frequency range, which forms a primary cell providing a contiguous set of communication resources across the first frequency range and providing one or more control channels for transmitting signaling messages to the communication device or receiving signaling messages from the infrastructure equipment, wherein the controlling of the transmitting the signals or receiving the signals includes:

detecting signals received within one or more predefined candidate channels within a second frequency range which is different to and mutually exclusive from the first frequency range, each one of the candidate channels in the second frequency range representing a minimum unit of communication resource which can be used to receive data on the downlink, generating, for each of the one or candidate channels, a channel state report from determined relative strength of the signals received in each of the plurality of candidate channels, transmitting the channel state report for each of the plurality candidate channels to the infrastructure equipment, receiving an indication, from the infrastructure equipment, of one or more component channels selected from the one or more candidate channels from which the communication device can receive signals from the infrastructure equipment on the down-link, the one or more component channels having been selected from the predefined one or more candidate channels within the second frequency range using the channel state report of each of the plurality of candidate channels by interpreting each of the channel state report differently depending on when the relative strength of the signals is measured, transmitting the one or more channel state reports to the infrastructure equipment via the first frequency band providing the primary cell, and receiving the indication of the selected one or more component channels, which have been selected by the infrastructure equipment by determining, from the generated channel state report for each of the one or more candidate channels, a relative interference from other sources, the one or more selected component channels in the second frequency range being formed by the infrastructure equipment into the down-link channel to provide a secondary cell.

9. An infrastructure equipment forming part of a mobile communication network for transmitting data to or receiving data from communication devices, the infrastructure equipment comprising:

a transmitter configured to transmit signals to communication devices via a wireless access interface, a receiver configured to receive signals from the communication devices via the wireless access interface, and a controller for controlling the transmitter and the receiver to form the wireless access interface for transmitting to the communication devices and receiving the data from the communication devices, the wireless access interface providing a first primary carrier within a first frequency range, which forms a primary cell providing a contiguous set of communication resources across the first frequency range, wherein the controller is configured, in combination with the receiver and transmitter, to receive from one or more of the communication devices a channel state report for each of one or more predefined candidate channels within a second frequency range which is different to and mutually exclusive from the first frequency range, each one of the candidate channels in the second frequency range representing a minimum unit of communication resource which can be used to receive data on the downlink, each of the channel state report being generated from determined relative strength of the signals received in each of the predefined candidate channels, select, from the one or more candidate carriers, one or more component carriers for use in transmitting signals to at least one of the communication devices within the second frequency range to form a down-link providing a secondary cell, for the one or more communication devices, based on the received channel state reports by interpreting each of the channel state reports differently depending on when the relative strength of the signals is measured, transmit an indication identifying the selected one or more component channels to the at least one communication device for use in transmitting signals to the one or more communication devices via the second frequency range, select the one or more component channels by identifying, based on a schedule of down-link transmitted signals, in which the infrastructure equipment has transmitted down-link signals via the second frequency range, a sub-set of the plurality of candidate channels for which the channel state reports relate to signals received from sources other than the infrastructure equipment by the one or more communication devices, and using the channel state reports from the sub-set of the plurality of candidate channels in which the infrastructure equipment has not schedule down-link transmitted signal.

10. The infrastructure equipment as claimed in claim 9, wherein the selected one or more component channels form one or more component carriers for the secondary cell.

11. The infrastructure equipment as claimed in claim 9, wherein the channel state reports are received from the communication devices on the up-link of the primary cell.

12. The infrastructure equipment as claimed in claim 9, wherein the channel state report for each candidate channel includes a channel quality measure, and the controller includes a memory, and the controller is configured to generate the channel quality measure for each of the candidate channels for each predetermined period, by storing one or more samples of an estimate channel quality measure, received from the one or more communication devices at different times within the predetermined period, and combining the one or more samples of the estimated channel quality measure to form the channel quality measure.

13. The infrastructure equipment as claimed in claim 9, wherein the one or more reporting communication devices which transmit the channel state reports to the infrastructure equipment are different to the at least one capable communication device which receives the indication identifying the selected one or more component channels for use in receiving signals via the second frequency range.

14. A method of transmitting data to or receiving data from communication devices using an infrastructure equipment, which forms part of a mobile communication network, the method comprising:

transmitting signals to communication devices via a wireless access interface, receiving signals from the communication devices via the wireless access interface, and controlling the transmitting and the receiving to form the wireless access interface for transmitting the data to the communication devices and receiving the data from the communication devices, the wireless access interface providing a first primary carrier within a first frequency range, which forms a primary cell providing a contiguous set of communication resources across the first frequency range, wherein the transmitting the signals to the communication devices includes:

receiving from one or more of the communication devices a channel state report for each of one or more predefined candidate channels within a second frequency range which is different to and mutually exclusive from the first frequency range, each one of the candidate channels in the second frequency range representing a minimum unit of communication resource which can be used to receive data on the downlink, each of the channel state report being generated from determined relative strength of the signals received in each of the predefined candidate channels, selecting, from the one or more candidate carriers, one or more component carriers for use in transmitting signals to at least one of the communication devices within the second frequency range to form a down-link providing a secondary cell, for the at least one communication device, based on the received channel state reports by interpreting each of the channel state reports differently depending on when the relative strength of the signals is measured, transmitting an indication identifying the selected one or more component channels to the at least one communication device for use in transmitting signals to the one or more communication devices via the second frequency range, selecting the one or more component channels by identifying, based on a schedule of down-link transmitted signals, in which the infrastructure equipment has transmitted down-link signals via the second frequency range, a sub-set of the plurality of candidate channels for which the channel state reports relate to signals received from sources other than the infrastructure equipment by the one or more communication devices, and using the channel state reports from the sub-set of the plurality of candidate channels in which the infrastructure equipment has not schedule down-link transmitted signal.

15. The mobile communication network including the infrastructure equipment as claimed in claim 9.

16. A communication device for transmitting data to or receiving data from a mobile communication network, the mobile communication network including infrastructure equipment, the infrastructure equipment providing a wireless access interface for transmitting signals to or receiving signals from the communication device, the communication device comprising:

transmitter circuitry configured to transmit signals to the infrastructure equipment via the wireless access interface, receiver circuitry configured to receive signals from the infrastructure equipment via the wireless access interface, and controller circuitry configured to control the transmitter and the receiver to receive data transmitted to the communication device from the infrastructure equipment via the wireless access interface, the wireless access interface providing a primary carrier within a first frequency range, which forms a primary cell providing a contiguous set of communication resources across the first frequency range and providing one or more control channels for transmitting signaling messages to the communication device or receiving signaling messages from the infrastructure equipment, wherein the controller circuitry is configured, in combination with the receiver circuitry and transmitter circuitry, to detect signals received within one or more predefined candidate channels within a second frequency range which is different to and mutually exclusive from the first frequency range, each one of the candidate channels in the second frequency range representing a minimum unit of communication resource which can be used to receive data on the downlink, generate, for each candidate channel, a channel state report from determined relative strength of the signals received in each of the candidate channels, transmit the channel state report for each of the candidate channels to the infrastructure equipment, receive an indication, from the infrastructure equipment, of one or more component channels selected from the one or more candidate channels from which the communication device can receive signals from the infrastructure equipment on the down-link, the one or more component channels having been selected from the predefined one or more candidate channels within the second frequency range using the channel state report of each of the plurality of candidate channels by interpreting each of the channel state report differently depending on when the relative strength of the signals is measured, transmit the one or more channel state reports to the infrastructure equipment via the first frequency band providing the primary cell, and receive the indication of the selected one or more component channels, which have been selected by the infrastructure equipment by determining, from the generated channel state report for each of the one or more candidate channels, a relative interference from other sources, the one or more selected component channels in the second frequency range being formed by the infrastructure equipment into the down-link channel to provide a secondary cell.

* * * * *